May 16, 1939. R. O. NELSON Re. 21,084

VARIABLE TRAFFIC SIGNAL

Original Filed May 16, 1925 2 Sheets-Sheet 1

Inventor
ROBERT O. NELSON
By
Attorney

May 16, 1939. R. O. NELSON Re. 21,084

VARIABLE TRAFFIC SIGNAL

Original Filed May 16, 1925 2 Sheets-Sheet 2

Inventor
ROBERT O. NELSON
By
Attorney

Reissued May 16, 1939 Re. 21,084

UNITED STATES PATENT OFFICE 21,084

VARIABLE TRAFFIC SIGNAL

Robert O. Nelson, deceased, late of Portland, Oreg., by the Engineering & Research Corporation, East Norwalk, Conn., assignee Original No. 1,665,560, dated April 10, 1928, Serial No. 30,865, May 16, 1925. Reissue No. 17,602, dated February 18, 1930, Serial No. 354,672, April 12, 1929. Application for reissue December 16, 1938, Serial No. 246,209

25 Claims. (Cl. 177—337)

This invention relates to traffic controlling and regulating devices, and the primary object is to provide an automatic signalling device at the intersection of a main or arterial highway and a cross road which ordinarily accommodates a lesser amount of traffic, whereby the right of way will be constantly maintained on the highway until a vehicle on the cross road approaches the intersection, whereupon the signalling system will be reversed, by being actuated by such vehicle, to give it the right-of-way across the highway, after which the right-of-way signals again revert to the highway of main traffic. A further object consists in providing means whereby the right-of-way will be automatically alternated for periods of, for instance, thirty seconds to each road when traffic is constantly approaching the intersection on the cross road. Still further and more specific objects will be disclosed in the course of the following specification, reference being had to the accompanying drawings, wherein:

Figure 9:
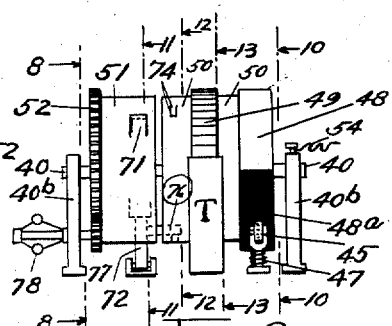
Figure 9 is an elevation of an alternator used in the device.
Figure 10:
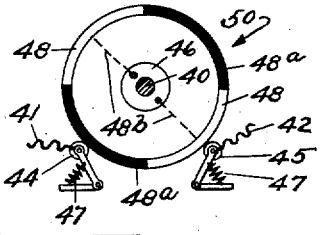
Figure 11:
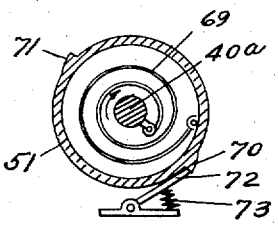
Figure 12:
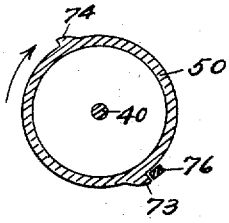
Figure 13:
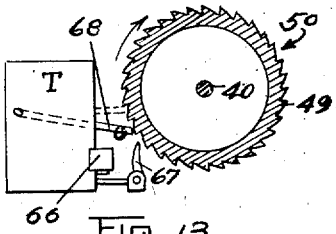

Figures 8, 10, 11, 12, and 13 are sectional views as seen substantially on the respective lines 8—8, 10—10, 11—11, 12—12, and 13—13, in Figure 9.

Figure 1:
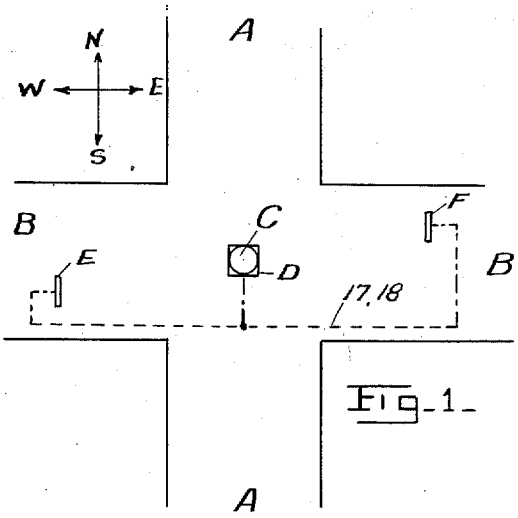
Figure 1 is a plan view of a street or road intersection, showing the position of the trigger switches in the cross road.

Referring to the drawings more particularly and by reference characters, A designates a north and south street, lane or road, hereinafter referred to as the highway, which is crossed by an east and west street B, hereinafter designated as the cross lane, or road, and adjacent the juncture or interfering point of these traffic lanes, as at the middle point of the intersection is a conventional signalling standard C, in the base of which may be arranged the control box D of the traffic signaling apparatus. The signals may be of any of the well known types for indicating right of way for one or the other lane. In the embodiment illustrated "Stop" and "Go" signs are electrically lighted and alternated so that when the sign reads "Stop" in one direction it will read "Go" in the other or cross direction, and vice versa. Thus in Figure 3 I have indicated signal lamps R, R as the red or stop lamps for the highway, and these lamps are circuitously connected with the lamps G, G, which are the green or "Go" lamps of the cross road; while the $R^1$, $R^1$ "Stop" lights for the cross road are connected in circuit with and are simultaneously energized with green "Go" lamps $G^1$, $G^1$, which give the right-of-way to the highway traffic, and stop the cross road lane traffic. It will be perceived that the apparatus illustrated utilizes visual signals The circuit controlling mechanism (later to be described) which controls the two circuits to the lamps in the signal is preferably contained within the control box D, and the traffic situation on the cross road is indicated and communicated to this mechanism through auxiliary circuits which are controlled by what may be conveniently termed controllers, or trigger switches E and F These controllers are actuated, in the embodiment illustrated being closed by the passing of vehicles over them each vehicle serving to cause a single actuation of the controller E or F as the case may be. These switches are secured in the street or road B and are arranged on the approach side of the signal and in the path of travel of the vehicles about as shown in Figure 1. As illustrated, the controller E or F occurs in but one lane, the cross lane.

Figure 2:
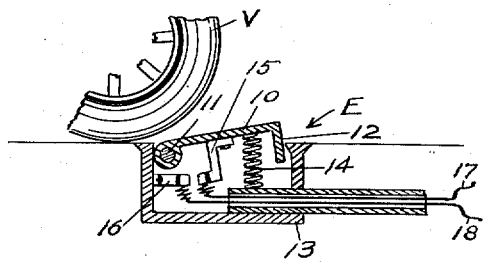
Figure 2 is a sectional elevation through one of the trigger switches.
Figure 3:
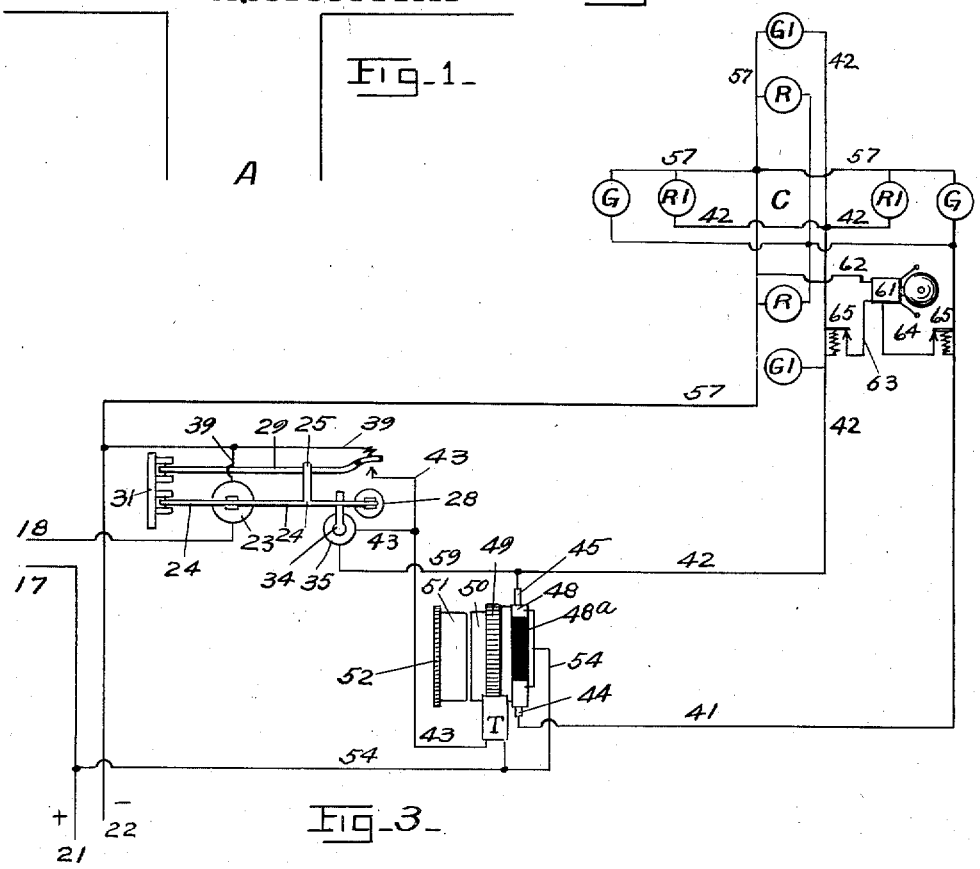
Figure 3 is a diagrammatic plan view, showing the wiring and connection of the electrical control system.
Figure 4:
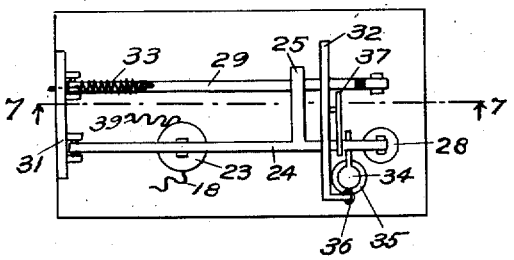
Figure 4 is a plan view of a magnetic switch employed in the circuit system.

The design or construction of these controllers or trigger switches may be greatly varied and modified, but a preferred form is illustrated in Figure 2 and is substantially the same as the trigger switch shown in Figure 3 of co-pending application for patent Serial No. 695,596, which was filed on February 27, 1924, for Automatic variable traffic regulator. It consists, primarily, of a box or casing 13 which is imbedded in the street, and has a plate 10 pivotally secured therein, as at 11. The swinging end of the plate 10 has a flange 12 which tends to keep the box closed when the plate is in its raised position and as not being depressed by a vehicle. The plate 10 is normally retained in an inclined or raised position as shown, by a spring 14, but when travelled over by the wheel of a vehicle is depressed to a flush or horizontal position, where it stops. A pair of switch terminals 15 and 16 are, respectively, secured to the plate 10 and box 13, and close together when the plate is depressed, and thus close a circuit through wires 17 and 18 which lead to the control box through a suitable conduit.

Figure 5:
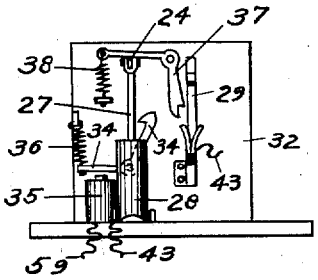
Figures 5 and 6 are end and side views, respectively, of the switch shown in Figure 4.
Figure 6:
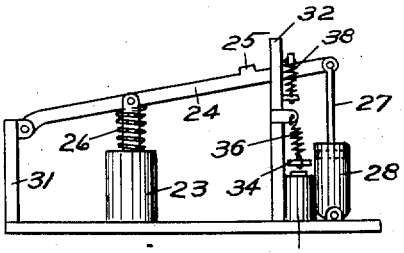
Figure 7:
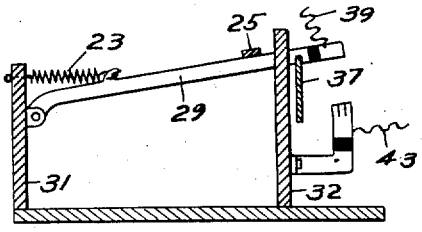
Figure 7 is a sectional elevation on the line 7—7 in Figure 4.
Figure 8:
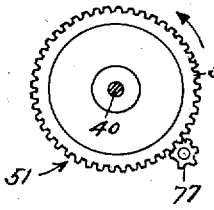

Before tracing the circuits in and to the control box and to the lighting group and trigger switches, the mechanism or mechanical structure contained within the control box will first be described as follows:

The magnetic switch device shown in Figures 3, 4, 5, 6, and 7 consists of a suitable base having an end wall 31 and an intermediate wall 32. A solenoid 23 is mounted on the base and serves, when energized, to pull a lever 24 down against the yielding tension of a spring 26. When the solenoid is deenergized, the spring 26 tends to restore the lever 24 to its upper position, as shown in Figures 5 and 6. This upward movement is retarded, however, by an air check consisting of a pivoted cylinder 28 in which operates a piston 27 which is connected to the outer extremity of the lever 24. A second lever member 29 is arranged parallel with the lever 24, and, like the latter, is pivoted at its rear end to the wall 31, while the forward ends of both levers are guided by being slidable in vertical slots in the wall 32. The lever 29 is yieldingly raised by a spring 33, and is depressed by a laterally projecting finger 25 of the lever 24. When the lever 29 is released by the finger 25 it is retained in its lowered position by a bell crank catch member 37, which is pivoted on 32 and retained by a spring 38. When the lever 24 now returns to its full upward positions, it moves the member 37 to release the lever 29, whereupon the latter may also return to its upward position. The terminal of a wire 39 is mounted at the outer end of the lever 29 so that it will close a switch with a wire 43 the terminal of which is stationary on the wall 32. This terminal and switch thus form a make and break device for the circuit of wires 39—43. 39 is also a supply wire to the solenoid 23. The lever 24 is arranged to be retained in its lowered position by a bell-crank hook member 34, which is retained in engagement with the lever 24 by a magnet 35, supplied by wires 43 and 59, but which is released by a spring 36, when the magnet is de-energized.

The alternator indicated in Figure 3 and shown more in detail in Figures 8 to 13, inclusive, will now be described as follows: A shaft 40 is journaled in suitable end brackets 40b. A drum 50 is rigidly secured on the shaft to rotate with it, and a drum 51 is rotatably mounted on the shaft. The drum 50 has a ratchet wheel 49 adapted to be engaged by a timing unit or mechanism T when a circuit is closed through the wires 43 and 54.

The timer T may be of any common and well known construction which is capable of lifting and dropping an arm or dog at regular intervals so as to turn the ratchet wheel 49 the length of one tooth for each elevation of the dog. A pawl 67 is brought to bear against the ratchet wheel 49 by a magnet 66 which is also placed in the circuit 43—54. It will thus be seen that the pawl 67 will prevent the reverse rotation of the ratchet wheel when the latter is being rotated by the dog 68, but will allow the wheel to return to its initial position when the timer is inactive and the circuit 43—54 is broken. Thus it will be seen that if the circuit 43—54 is energized continuously the timer will at periodic and regular intervals lift the arm 68, causing ratchet wheel 49 to be rotated tooth by tooth at a definite rate which is determined by the space between the teeth on the ratchet wheel and by the frequency of the raising and lowering of the arm 68. In this particular embodiment the rotation is, for example, one complete revolution of ratchet wheel 49 in two minutes. When the circuit 43—54 is de-energized, the timer T becomes inactive, and the pawl 67 is released by magnet 66, thereby permitting drum 50 with ratchet wheel 49 and the accompanying commutator to be returned by spring 69 to its normal position so that either tripping lug 73 or 74 is at rest against projection 76.

Within the drum 51 the shaft is enlarged as at 40a (Fig. 11) and to it is fastened one end of a coil spring 69, the other or outer end of which is secured to the inner face of the drum. Now when the shaft is rotated, by the drum 50, the spring 69 winds itself about the shaft. The drum 51 is held stationary, against the rotating tendency of the spring, by a pawl 72, which is held against the periphery of the drum by a spring 73, and releasably engages the stop or lug 70 or 71 on the drum. As the shaft 40 continues to rotate it will be evident that the spring tension would soon become excessive, and to relieve this tension (without reversing the drum) the drum 50 is provided with a pair of diametrically opposed tripping lugs 74 and 74', which at certain intervals in the movement of the drum 50 act against a projection 76 of the pawl 72, and release the latter from the lugs 70, 71. To prevent the drum 51 from returning too rapidly, when so released, a small governor 78 is provided which is operatively associated with the drum through gears 77 and 52.

When the ratchet wheel 49 is freed from the timer T, the spring 69 will reverse the direction of the shaft and also the drum 50. This reverse movement is checked, however, by the arm 76 of the pawl 72, which engages either of the teeth 74 or 74' to stop the drum 50 in an initial position.

On the drum 50 is a peripheral path 48—48a (Figs. 9, 10) having alternating conducting and non-conducting areas, the conducting areas providing contacts which rotate in contact with contact brushes 44 and 45, which are yieldingly retained in contact with the path by springs 47, and which are terminals for wires 42 and 41, respectively. The conducting areas 48 are supplied by wires 48b from a member 46 on the shaft 40, which in turn is supplied through its journal in the bracket 40b by the wire 54. The initial position of the drum is such that the terminal brush 45 will have contact with an intermediate point on one of the areas 48. It will be seen that the drum contacts and the brush contacts 44 and 45 provide a switch, wherewith circuit may be made and broken with wires 41 and 42. As the highway right of way controlling circuit includes wire 42, and the cross lane right of way controlling circuit includes wire 41; shift of the switch contacts just mentioned is cooperative to shift right of way indication as between the highway and the cross lane.

The circuit wiring will now be set forth. Wires 21 and 22 represent the power supply, which, for convenience in tracing, we can assume to be positive in wire 21, and negative in wire 22. When there is no cross road traffic to actuate the switches E or F there will be a closed circuit through the elements 21, 54, 40b, 40, 46, 48b, 48, 45, 42, 57, and 22, thus lighting the lamps $R^1$, $R^1$ and $G^1$, $G^1$, and giving a constant right of way to the traffic on the highway. Now when an east or west bound vehicle approaches the intersection on the cross road where the signal is located, it depresses the plate 10 of the trigger switches E or F, and in so doing closes a circuit between the wires 17 and 18, and energizes the solenoid 23, via 39 and 18, resulting in the closing of a contact between the terminals 39 and 43 as above described. The wire 43 now gives a negative supply to the magnet 35 and the timer T of the alternator, and the wire 54 carries a positive charge to the timer T and to the contact areas 48. Thus the timer T is actuated as soon as the contact between 43 and 39 is made. A branch 59 of the wire 42 carries a positive charge, when the terminal 42 has contact with 48 of the alternator, to the retention magnet 35, and consequently the magnet 35 is energized while the make and break device 43—39 is closed. When a circuit is closed through wires 42, then the signal lamps $G^1$, $G^1$, and $R^1$, $R^1$, are supplied, signalling the right of way to the highway traffic as 57 is the negative wire to all the lamps, and when the wire 41 is charged then the opposite lamps G, G, R, and R are energized, to signal the right of way to traffic on the cross road.

In order that a bell signal of short duration may be given, as the right of way is changed from one direction to the other, a thermal switch 65 is provided in each of the circuits of 41 and 42. Each of these switches is constructed so that it will break the circuits through wires 63 and 64, to the bell 61, shortly after the current starts flowing in 41 or 42. To avoid "short circuits" separate circuits are provided for the bell by way of a negative wire 62 to the wire 57.

Having now described the construction and action of the device and its various parts; assume that a single vehicle approaches on the cross street and indicates its presence by actuating the controller, or trigger switch E, for example. This action energizes solenoid 23 and causes arm 24 to repress its associated arm 29 and close a circuit through contacts 39, 43. When these contacts are closed the timer T is energized and also operates as a motor part and rotates the alternator 50 so that insulation section 48ª engages a fixed contact 45 and interrupts highway light circuit 42 so that the green lights on the highway and the red lights on the cross street indicative of right of way on the highway are extinguished. Simultaneously with this movement right of way is transferred to the cross lane because a contact section 48 engages cross lane, brush contact 44 and energizes the cross lane light circuit 41, thus causing a "Stop" signal to be given to the highway and a "Go" signal to the cross street, and the vehicle is given a definite time to cross the intersection.

The period of time given the vehicle to cross the intersection is controlled by the air check 28 which is brought into operation at the instant highway circuit 42 is interrupted. When circuit 42 is interrupted, magnet 35 is de-energized, thus releasing catch 34 and permitting bar 24 to move slowly upward against the retarding action of air check 28 and during its upward travel bar 24 engages latch 37 and releases bar 29. When the upward limit is reached, which may be after a predetermined, minimum period of eight or ten seconds, for example, as determined by the dash-pot timer device, contacts 39—43 are broken and the timer T with its associated magnet is de-energized, thereby permitting the pawl 67 to release the alternator which will be immediately set back to normal position by the action of spring 69. The return movement of the alternator interrupts circuit 41 and restores circuit 42 to normal condition so that the "Go" signal is returned to the highway and the "Stop" signal to the cross street.

In the event that there is a continuous stream of traffic on the cross street, the arm 24 is repeatedly drawn down by solenoid 23 and the timer T is constantly energized so as to rotate the alternator at a uniform rate so that the right of way is alternately given to each street for desired predetermined periods of time. The time is regulated by the arrangement of the segments 48 and 48ª on the alternator or switch. When the apparatus is in idle condition awaiting actuation by traffic, the highway contact brush 45 lies against contact segment 48, thus completing circuit to the lights indicative of highway right of way. Obviously therefore the period of duration of highway right of way is dependent on the time period of this mutual contact of brush 45 and segment 48. For exemplary purposes of this disclosure, this contact lasts 30 seconds, at the uniform rate of the motor part T. Should the rate of this motor part be varied the time period of contact may be increased or decreased as is apparent.

One important feature of the invention is that when traffic on the cross street has maintained the right of way for a maximum period of thirty seconds, for example, the right of way is automatically taken from the cross street and given to the highway for an equal period of thirty seconds, even though other approaching vehicles have indicated their presence on the cross street. This right-of-way period for the highway traffic cannot be interrupted because the continuous arrival of vehicles on the cross street has re-energized solenoid 23 repeatedly, drawing down arm 24 repeatedly into its down position, thus maintaining contacts 39 and 43 closed continuously. Meanwhile the timer T has rotated the alternator 50 until a non-conducting area 48ª has been brought into contact with stationary contact 44 while a conducting area 48 has been brought into contact with stationary contact 45. This has de-energized the circuit through 41 which gives the "Go" signal to the cross street and the "Stop" signal to the main highway, and has energized the circuit through 42 which gives the "Go" signal to the main highway and the "Stop" signal to the cross street. Simultaneously with the energizing of this circuit, magnet 35 has been energized, and arm 24 is locked in its down position by catch 34. The timer continues to rotate the alternator for another thirty seconds, for example, at the end of which time the movement of the segments has caused circuit 42 to be interrupted and circuit 41 closed so that the right of way is again given to the vehicles waiting on the cross street so that they may proceed across the intersection. When circuit 42 is interrupted, magnet 35 is de-energized and latch 34 releases bar 24 so that it may slowly rise, and if no other vehicle approaches on the cross street to operate the trigger switch E, the arm 24 reaches its upward limit in about ten seconds and thereby opens contacts 39—43 and thus de-energizes the timer and permits the alternator to reset to normal position as previously described.

It will be perceived from the foregoing that notwithstanding the traffic actuated controller E or F may be found in but one lane, nevertheless, in conjunction with other elements of the apparatus, the traffic in both lanes is automatically controlled in a practical and efficient way. When the apparatus is idly awaiting traffic and but one vehicle approaches, the single actuation of the controller by said vehicle causes right of way indication to be transferred from the highway to the lane of the controller and retransferred thereafter to the highway, all without further actuation of the controller. But it will be noted that this transfer and retransfer is depending upon actuation of the controller by the vehicle and is accomplished by actuation by but one vehicle. It will furthermore be noted that in accordance with the construction described, there is always at least a predetermined period of several seconds, in the present embodiment 15 seconds, after said actuation of the controller, during which the right of way remains with the highway before being transferred to the cross lane. This not only affords opportunity for any close highway traffic to pass the intersection before the transfer of right of way to the cross road but it also affords at least a predetermined period of highway right of way after said retransfer to the highway and before further transfer to the cross lane as will hereinafter appear.

It will be noted that the single actuation of the controller E or F results in lowering the lever 24 by energization of the solenoid 23, and that repeated actuation of the controller repeatedly lowers said lever in the event that the latter has risen. When the lever 24 is lowered during highway right of way, it is locked down by the magnet 35, the motor circuit 43 being simultaneously energized through the make and break device 39—43. As soon as the drum switch has rotated sufficiently to cut out the highway circuit wire 42, the cross lane wire 41 will be energized through its brush 44 making contact with a rotating contact segment 48 and, as the magnet 45 is deenergized at this time because the wire 59 is deenergized, the lever 24 may immediately begin to rise and eventually in at least a predetermined minimum period of time to cause break of the motor circuit, whereupon the drum will immediately be rotated to cut out cross lane brush contact 44, and thus, at the end of this predetermined minimum period, cut out the cross lane right of way. If no other vehicle actuates the controller within this minimum predetermined period, the motor circuit will be broken at the make and break point 39—43, cross lane right of way will cease to endure, and the apparatus will operate automatically to retransfer right of way to the highway as will be apparent from the explanation already given. However, should a second vehicle actuate the controller before the expiration of said predetermined minimum period, that is, before the lever 24 has risen sufficiently to actuate the bell crank 37 to release lever 29, said lever 24 will be lowered and the motor circuit will remain closed at the make and break device 39—43, so that the motor will continue to operate and rotate the drum 50.

Thus successive actuation of the controller during cross lane right of way, each succeeding actuation being within the predetermined minimum period from its prior actuation, will cause the cross lane right of way to endure and be prolonged to beyond said predetermined minimum period. Eventually the cross lane brush contact 44 will escape the rotating contact segment notwithstanding the repeated actuations of the controller, in which event highway right of way will be restored, as will be understood. It will be perceived, that the make and break device 39—43 and its associated controlling devices act as a timing device, or timer; a minimum period timer, as it were. When only one vehicle has actuated the controller, this minimum period timer will time during cross lane right of way and will terminate cross lane right of way at the end of the minimum predetermined period of, for example, 10 seconds, successive actuation of the controller as before explained being required to cause duration in the lane of the controller uninterrutedly to continue for greater than said minimum period.

It will also be perceived that the drum switch operated by its motor timer T serves as a timing device or mechanism for each right of way, inasmuch as in this particular embodiment, each right of way is dependent upon contact of the controlling circuits 41 or 42 at this switch. These two timing devices form a timing mechanism cooperable by action of the apparatus to vary the duration or period of continuity, of right of way indication between a predetermined minimum and a greater period of time in the cross lane, and one of these devices is cooperable to prolong right of way indication in the lane of the controller to from at least a predetermined minimum period up to a predetermined maximum period, the period being variable in accordance with the interval between successive actuations of the controller. In the cross lane, duration of right of way indication, for at least a predetermined period, is compelled before transfer to the highway and, after transfer to the highway, duration in the highway for at least a predetermined period is compelled before further transfer to the cross lane.

When the controller is actuated at such intervals that successive actuations are not within the predetermined minimum timing interval afforded by operation of the dash pot timer, but are outside such interval, the resultant right of way in the cross-lane from each such controller actuation will continue only for the predetermined minimum period, as will readily be seen.

It will be apparent that, in the present embodiment, duration of cross lane right of way beyond the predetermined minimum period is dependent on closure of the motor circuit beyond such minimum period. As the motor operates during cross lane right of way, the mutual contact of the drum switch contacts for the cross lane circuit endures for a time dependent also upon the actuation of the controller EF. If the controller is actuated successively within the aforesaid predetermined minimum period, this mutual contact may endure for the full length of the cross lane contact segment of the switch, whereas if the motor circuit is cut out at the end of the minimum predetermined period the time period of this mutual contact would be less because, as soon as the motor circuit was broken by the minimum period timer, the mutual contact at the switch would be immediately broken on account of the transfer to the highway, right of way contacts effected at the switch by the spring 69. The motor actuated timer is a combined right of way timer and right of way shifter, the make and break timer device 39—43 being the more directly controller-actuated. One however is cooperable to time right of way during timing by the other, and it will be noticed that the minimum period timer cooperates to vary duration of right of way which would otherwise result from the combined timer and shifter, this latter timer being also selective of right of way as between the two lanes, the other timer cooperating to vary but one of these rights of way namely the cross lane right of way, time control of the highway right of way being practically independent of operation of the controller actuated timer. In the present embodiment the drum switch timer provides a maximum control period for each lane, whereas the other timing device has at least a predetermined minimum control period which is effective to limit the right of way as determined by the drum switch timer for the cross lane.

It will be perceived that the invention provides devices operative to cause at least a predetermined minimum timing period which is enlargeable by action of the controller. The dashpot lever 24 may be drawn down by controller energization of the solenoid 23, before the lever reaches its upper limit. If it is drawn down shortly after it begins to rise a certain amount of prolongation results. If the lever rises further before being drawn down an increased amount of prolongation results. Thus prolongation of right of way beyond the minimum interval of time will be increased as the lapsed time between the beginning of one interval and the beginning of the next succeeding interval increases.

During cross lane right of way, should the controller not be actuated before the lever 24 rises sufficiently to cause breaking the contact 39, 43; that is, not before close of the minimum timing period, duration of right of way in the cross lane will be concluded at the end of the minimum timing period. Thus duration of right of way in the lane of the controller beyond the minimum period is dependent upon the actuation of the controller after the inception of and before the close of the minimum timing period. Also it will be perceived that successive actuation of the controller is adapted to give a greater period of duration of right of way in one of the lanes, the cross lane, than is a single actuation of the controller, and that the mechanism confines continuous right of way to from an original predetermined minimum interval to a maximum interval by actuation of the controller, this maximum interval being capable of adjustable variation as determined by the rate of movement of the motor mechanism.

Inasmuch as an important feature of the invention concerns the indication of right of way for the highway when the traffic approaches the intersection, the construction provides for compelling highway right of way subsequently to be indicated, once the right of way has been transferred to the cross lane. In the present embodiment, upon a single actuation of the controller, the highway circuit 42 is remade by automatic operation of the apparatus after it is once broken and without further actuation of the controller. Once the motor mechanism is started in response to actuation of the controller, at least a predetermined interval of time elapses before the motor mechanism is arrested. It will be seen that the minimum period timer assures this.

It is further understood that various modifications may be made in the design and structural details herein exemplified, without departing from the invention.

The word "time" used in this specification and appended claims with respect to signal periods or timing mechanism means measured time such as that measured by a clock or other chronometer, as distinguished from indefinite or haphazard time of arrival and passage of vehicles.

Having now, therefore, fully shown and described the invention, what is claimed to be new and desired to be protected by Letters Patent is:

1. A signalling system arranged at the intersection of a highway and a cross road for regulating traffic, said system including a highway lamp circuit and a cross road lamp circuit, a time controlled switch associated with said circuits, for alternately opening and closing the same, said switch being normally idle in an initial position so as to normally retain the highway circuit closed and permit highway traffic to cross the intersection, means actuated by a vehicle approaching the intersection on the cross road for actuating the switch so as to alternately de-energize the highway circuit and energize the cross road circuit to successively signal the right-of-way to the cross road and highway, said means including the time controlled switch and being operative for automatically restoring the switch and the lamp circuits to their initial conditions.

2. A street crossing signal system including a pair of signal circuits, one circuit including a signal to indicate Stop and the other to indicate Go, switching means normally maintaining the Go signal circuit closed and the Stop signal circuit open and movable through a cycle to first reverse and then restore to normal the circuit conditions, normally inactive time controlled means for moving said switching means through its cycle, vehicle actuated means for rendering said time controlled means active, and means operated by the switch at the end of its cycle to render the time controlled means again inactive.

3. A street crossing signalling system including a pair of signal circuits, one circuit including a signal to indicate Stop and the other to indicate Go, switching means movable through a cycle for alternately energizing said circuits, normally inactive time controlled means for moving said switching means through its cycle, vehicle actuated means for rendering said time controlled means active, and means including the switch for restoring the time controlled means to its inactive condition.

4. A street crossing signalling system including a pair of signal circuits, one circuit including a signal to indicate Stop and the other to indicate Go, switching means movable through a cycle for alternately energizing said circuits, normally inactive time controlled means for moving said switching means through its cycle, vehicle actuated means for rendering said time controlled means active, and means operated by the switch at the end of its timed cycle for rendering the time controlled means again inactive.

5. A street crossing signalling system including a pair of signal circuits, one circuit including a signal to indicate Stop and the other to indicate Go, the Go signal circuit of which is normally closed and the Stop signal circuit open, a normally inactive time controlled switching means for successively and alternately reversing the open and closed positions of the circuits for predetermined periods of time, vehicle actuated means for rendering the switching means active, and means including the time controlled switching means for rendering the switching means inactive so as to restore the circuits to their initial conditions.

6. A street crossing signalling system including (A) a pair of signal circuits, one for the cross street and one for the highway (B), switching means having a normally inactive position and movable through a cycle for alternately energizing said circuits (C), normally inactive time controlled means for moving said switching means through its cycle, said time controlled means comprising (*a*) motor means adapted to move the cyclic switching means from normal position through cross street and highway positions and to the normal position, (b) a controlling switch for said motor means, (c) a timed latching device adapted to hold the motor controlling switch closed in the cross-road position, and (d) a timed latching device adapted to hold the motor controlling switch closed in the highway position (D), vehicle actuated means for rendering said time controlled means active, comprising a traffic actuated device adapted momentarily to move the motor controlling switch to its latched position, and (E) means including the cyclic switch for restoring the time controlled means to its inactive condition comprising (1) means controlled by the cyclic switch for maintaining the cross-road latch closed for a predetermined time in the cross-road and releasing it after the highway latching device has become effective for the highway time period, and (2) means for releasing the highway latch after a predetermined time period ending in the cross-road position, said highway latch remaining released unless the cross-road latch has been latched by a vehicle actuation during the highway or normal positions.

7. A street crossing signalling system including a highway right-of-way circuit and a cross-road right-of-way circuit, a cyclic switch for said circuits having a normal rest position from which it is adapted to be moved through a cycle to alternately energize said circuits and return to normal, timing motor mechanism actuatable for moving said cyclic switch through such cycle at a predetermined time rate to provide predetermined time periods of right-of-way for the highway and the cross-road, traffic actuated means in the cross-road, a holding device operable initially by actuation of said traffic actuated means and effective for actuating said motor mechanism in said rest position to initiate such cycle and for maintaining said motor mechanism actuated in such cycle after such initiation, a time control connection between said holding device and said cyclic switch to render said holding device ineffective in the cross-road part of the cycle in order to prepare said mechanism to terminate cyclic operation in said rest position, a time controlled actuating device for said motor mechanism connected with said cyclic switch to be operated by the latter in the cross-road part of the cycle to actuate said mechanism after release of said holding device to provide a time period of cross-road right-of-way and thereafter to return said cyclic switch to normal to complete such cycle, the said control connection being operated by said cyclic switch to render said holding device again effective throughout the highway part of the cycle to be re-operated by any further actuation of said traffic actuated means in the highway part of the cycle to continue cyclic operation for another such cycle before termination in the normal rest position.

8. A street crossing signalling system including a highway right-of-way circuit and a cross-road right-of-way circuit, a cyclic switch for said circuits having a normal rest position from which it is adapted to be moved through a cycle to alternately energize said circuits and return to normal, traffic actuated means in the cross-road, time controlled mechanism for operating said switch through its cycle to provide a minimum predetermined time period of highway right-of-way and a period of cross-road right-of-way variable between definite minimum and maximum time limits and connected with said traffic actuated means so as to initiate such cycle in response to traffic actuation in the rest position, two timing devices forming a part of said mechanism to control said variable time period and each connected with said cyclic switch to be initiated into operation by the latter in the cross-road part of its cycle, one of said timing devices having a relatively short predetermined time period to provide said minimum time limit and the other said device having a longer predetermined time period to provide said maximum time limit, driving mechanism for said cyclic switch forming a part of said operating mechanism and connected to be actuated by the first timing device at the end of its timing period to return said switch to normal to terminate energization of said cross-road right-of-way circuit, said first timing device being adapted to be reset to repeat its time period and having linkage with said traffic actuated means rendered effective by said cyclic switch in said cross-road period of such switch to so reset said timing device by traffic actuation whereby said cross-road period will be prolonged by such traffic actuation within said maximum time limit.

9. A street crossing signalling system including a highway right-of-way circuit and a cross-road right-of-way circuit, a cyclic switch for said circuits having a normal rest position from which it is adapted to be moved through a cycle to alternately energize said circuits and return to normal, traffic actuated means in the cross-road, time controlled mechanism for operating said switch through its cycle to provide a minimum predetermined time period of highway right-of-way and a period of cross-road right-of-way variable between definite minimum and maximum time limits and connected with said traffic actuated means so as to initiate such cycle in response to traffic actuation in the rest position, two timing devices forming a part of said mechanism to control said variable time period and each connected with said cyclic switch to be initiated into operation by the latter in the cross-road part of its cycle, one of said timing devices having a relatively short predetermined time period to provide said minimum time limit and the other said device having a longer predetermined time period to provide said maximum time limit, driving mechanism for said cyclic switch forming a part of said operating mechanism and connected to be actuated by the first timing device at the end of its timing period to return said switch to normal to terminate energization of said cross-road right-of-way circuit, said first timing device being adapted to be reset to repeat its time period and having linkage with said traffic actuated means rendered effective by said cyclic switch in said cross-road period of such switch to so reset said timing device by traffic actuation whereby said cross-road period will be prolonged by such traffic actuation within said maximum time limit, and a latch device connected with said cyclic switch to be rendered effective by said switch for setting by any actuation of said traffic actuated means at any time throughout said highway period of said switch to maintain said operating mechanism operative after such actuation to move said switch through its cycle into its cross-road period, and to be released by said switch in said cross-road period when said two timing devices are rendered effective by said switch.

10. A street crossing signalling system including a pair of signal circuits, one for the cross street and one for the highway, switching means having a normally inactive position and movable through a cycle for alternately energizing said circuits, and returning to the normal inactive position, means for driving the switch, including a time controlled motor, which moves the switch through said cycle for timed periods on the two streets, a vehicle operated detector in the cross lane momentarily operable to energize the motor, a first and a second holding device adapted to hold the motor energized during the highway and cross street right-of-way periods, means operated by the switch for releasing the first holding device after the second holding device has become effective to maintain the motor circuit energized, and means for releasing the second holding device in the normal switch position unless the first device is operated by a vehicle actuation during the highway position, and two timing devices operable during the cross street right-of-way period, each set into operation at the beginning of said period and connected with the motor so that the first to release terminates the cross street period, the shorter timed device being resettable by said vehicle actuated means when a vehicle actuation occurs during its period.

11. An automatic signalling system for highway intersections including signal circuits arranged to provide a "Go" signal for the main highway and a "Stop" signal for the cross street, and circuits arranged to provide a "Stop" signal for the main highway and a "Go" signal for the cross street, switching means to alternately energize and de-energize the circuits through a cycle in which the "Go" signal is taken from the main highway and given to the cross street for a predetermined period and then returned to the main highway for at least a predetermined fixed minimum period, said switching means normally inactive for maintaining the "Go" signal on the main highway continuously, a switch adjacent to the highway to initiate the said cycle of the switching means, and means associated with the switching means to terminate the cycling of the switching means at the end of a cycle.

12. An automatic signalling system for highway intersections including signal circuits arranged to provide a "Go" signal for the main highway and a "Stop" signal for the cross street, and circuits arranged to provide a "Stop" signal for the main highway and a "Go" signal for the cross street, cyclic switching means to operate the signal through a cycle in which the "Go" signal is taken from the main highway and given to the cross street for a predetermined period, and then returned to the main highway for a predetermined fixed minimum period, said cyclic switching means normally inactive maintaining the "Go" signal on the main highway continuously, means actuated by a vehicle to initiate the said cycle of the cyclic switching means, means associated with the vehicle-actuated means to prematurely terminate, after a predetermined fixed minimum period of inaction of the vehicle means, that portion of the cycle in which the "Go" signal is given to the cross street, and means to retain the effect of an impulse from a vehicle passing over the vehicle-actuated means during the period in which the cyclic switching means is giving the "Go" signal to the main highway until the "Go" signal is given to the cross street.

13. An automatic signalling system for intersecting highways, comprising electric circuits for operating the signalling devices, switching devices cooperable for normally causing a "Go" signal to be exhibited on one street and a "Stop" signal on the other, means associated therewith for moving said switching devices through a cycle of operation to cause said signalling devices to be actuated through said circuits so as alternately to indicate "Stop" and "Go" signals respectively to the intersecting highways, means, including timing mechanism, for initiating and terminating the operation of the switching devices, and vehicle-actuated means for energizing said time-controlled means.

14. A traffic signalling apparatus having, in combination, a traffic actuated controller, right of way transferring mechanism controlled from said controller, and signal timing mechanism having a predetermined maximum timing period and a predetermined minimum timing period, said minimum period enlargeable up to the maximum period by action of said controller.

15. A traffic signaling apparatus for interfering traffic lanes and having, in combination, a right of way indicating device, a traffic actuatable controller, right of way transferring mechanism controlled from said controller, and two devices controlled from said controller each operable to control duration of right of way indication, one said device cooperative to vary duration of right of way indication otherwise resultant from the other, one said device having a predetermined maximum duration control period and the other said device having at least a predetermined minimum duration control period.

16. A traffic signaling apparatus for interfering traffic lanes and having, in combination, a right of way indicating device, a traffic actuatable controller, a combined right of way timer and right of way shifter for said indicating device, a controller-actuated, right of way timer, each said timer cooperable to time duration of right of way during a period of timing thereof by the other, said combined timer and shifter having a predetermined maximum timing period and said controller-actuated timer having a predetermined timing period less than said maximum.

17. A traffic signaling apparatus for interfering traffic lanes and having, in combination, a right of way indicating device, a traffic actuatable controller, a combined right of way timer and right of way shifter for said indicating device, a controller-actuated, right of way timer, one said timer cooperable to time duration of right of way during timing thereof by the other, said controller-actuated timer cooperative to vary duration of right of way indication otherwise resultant from the other timer, motor mechanism for actuating said combined timer and shifter, and a motor mechanism circuit made and broken by actuation of said controller.

18. A traffic signaling apparatus for interfering highway and cross lanes and having, in combination, a highway right of way controlling circuit, a cross lane right of way controlling circuit, a switch, including contacts for making and breaking said controlling circuits, cooperable to shift right of way indication as between said lanes, a traffic actuable controller in the cross lane, motor-mechanism having a make and break device in its circuit operable in response to actuation of said controller to actuate said switch to make contact with said controlling circuits one after the other so as to shift right of way indication back and forth between said lanes, and, in response to a single actuation of said controller to compel remaking the highway circuit after the same is broken, and means whereby successive actuation of said controller during right of way in the cross lane and within a predetermined interval of time from each other, compels mutual contact of the switch contacts for the cross lane circuit to endure beyond a time caused by a single actuation of said controller during cross lane right of way.

19. A traffic signaling apparatus for interfering highway and cross lanes and having, in combination, a highway right of way controlling circuit, a cross lane right of way controlling circuit, a switch, including contacts for making and breaking said controlling circuits, cooperable to shift right of way indication as between said lanes, a traffic actuatable controller in the cross lane, motor-mechanism having a make and break device in its circuit operable in response to actuation of said controller to actuate said switch to make contact with said controlling circuits one after the other so as to shift right of way indication back and forth between said lanes, and, in response to a single actuation of said controller to compel remaking the highway circuit after the same is broken, and means whereby successive actuation of said controller during right of way in the cross lane and within a predetermined interval of time from each other, compels mutual contact of the switch contacts for the cross lane circuit to endure beyond a time caused by a single actuation of said controller during cross lane right of way, duration of highway right of way being dependent on the time period of contact between the switch, contacts for the highway circuit, and means, dependent for operation upon the passage of at least a predetermined interval of time from a preceding actuation of said controller, to arrest operation of said motor-mechanism.

20. A traffic signaling apparatus for interfering traffic lanes and having, in combination, a right of way indicating device, a traffic actuatable controller in one lane and means cooperable, by a single actuation of said controller, to cause transfer of right of way indication to the lane of said controller from the other lane and compel duration of right of way indication in the lane of said controller for at least a predetermined period, and said means including a device cooperable to cause re-transfer to said other lane after a predetermined maximum period of duration in the lane of said controller.

21. An automatic signalling system for intersecting highways comprising electrically operated signalling devices, switching devices, means associated therewith for moving said switching devices through a cycle of operation to cause said signalling devices to alternately indicate "Stop" and "Go" signals respectively to the intersecting highways for predetermined periods, a timer for varying the cycle of operation of the switching devices and traffic-actuated means for initiating the operation of said switch-moving means and said cycle-varying means.

22. In an automatic signal mechanism for intersecting highways, the combination with signal means at the intersection to normally provide a "Go" signal for the main highway while giving a "Stop" signal for the intersecting street and another normally inactive signal means to provide a "Stop" signal for the main highway while giving a "Go" signal for the intersecting street, of a signal current supply, signal circuit switch devices and connections arranged to form a normal circuit through which current is supplied to one of the signal means to produce a "Go" signal for the main highway and a "Stop" signal for the intersecting highway, means including a timing mechanism, which when operated will move the signal circuit switch devices in such an order as to change the signals from "Go" and "Stop" signals for the main and cross highways respectively to "Stop" and "Go" for said highways, and after a delay restore the circuits to their normal condition, a switch adjacent to one of the highways, means operated by said highway switch for effecting an operation of said switch devices, and means associated with the switch devices to prevent a "Go" signal for the cross highway beyond its normal time limit until after a "Go" signal for the main highway has been restored and maintained for a period of time.

23. A traffic signaling apparatus for interfering traffic lanes and having, in combination, a right of way indicating device, a traffic actuatable controller in one lane, and means cooperable, by a single actuation of said controller, to cause transfer of right of way indication to the lane of said controller from the other lane and retransfer to the other lane and, after such retransfer, compel duration of right of way indication in said other lane for at least a predetermined period before further transfer to the lane of said controller.

24. A vehicle actuated traffic signal comprising: a pair of signal circuits, a normally inactive switch having contacts for alternately energizing said circuits, a motor for moving said switch from its inactive position through a cycle alternately to energize said signal circuits and return said switch to its inactive position, a circuit for energizing said motor, a vehicle operable detector for closing said motor energizing circuit, a time-controlled holding means actuated by the detector and rendered operable by a control circuit through said switch in its normal position for holding closed said motor energizing circuit, said control circuit being operated by said switch in traveling through its cycle for rendering said holding means operable through a part of such cycle and then releasing said holding means, after which said holding means may again be operated by vehicle actuation, a second time-controlled holding means operated by said switch during its cycle which holds said motor energizing circuit closed at and after the release of said first-mentioned holding means, said second means releasing at the end of its time period to deenergize said motor circuit and return the switch to its inactive position.

25. A street crossing signaling system including a pair of signal circuits, one for the cross street and one for the highway, switching means having a normally inactive position and movable through a cycle for alternately energizing said circuits, normally inactive time controlled means for moving said switching means through its cycle, said means comprising motor means adapted to move the cyclic switch from normal position through cross street and highway positions and to the normal position, an energizing circuit for said motor means, and a first and a second holding device adapted to hold the motor circuit energized during the street timed periods, said motor means being adapted to move the switch to the inactive position when the first holding device is released in the highway position and to move the switch past the inactive position into another cycle if said first holding device is then holding the motor circuit energized, vehicle actuated means in the cross street for rendering said time controlled means active, comprising a traffic actuated device momentarily operable to energize the motor circuit and operate the first holding device to maintain it energized, and means including the switch for restoring the time controlled means to its inactive condition comprising means operated by the switch for releasing the first holding device after the second holding device has become effective to maintain the motor circuit energized, and means operated by the switch for rendering the second holding device operative over a time period in a part of the cycle at the end of which time period the second holding device releases to terminate cyclic operation in the normal switch position.

THE ENGINEERING & RESEARCH CORPORATION,
*Assignee, by mesne assignments, of Robert O. Nelson, deceased, late of Portland, Oreg.*
By HENRY A. HAUGH, JR.
*President.*